May 12, 1936.   A. R. WILSON   2,040,353
RAILROAD CAR HANDLING DEVICE
Filed June 11, 1931   2 Sheets-Sheet 2
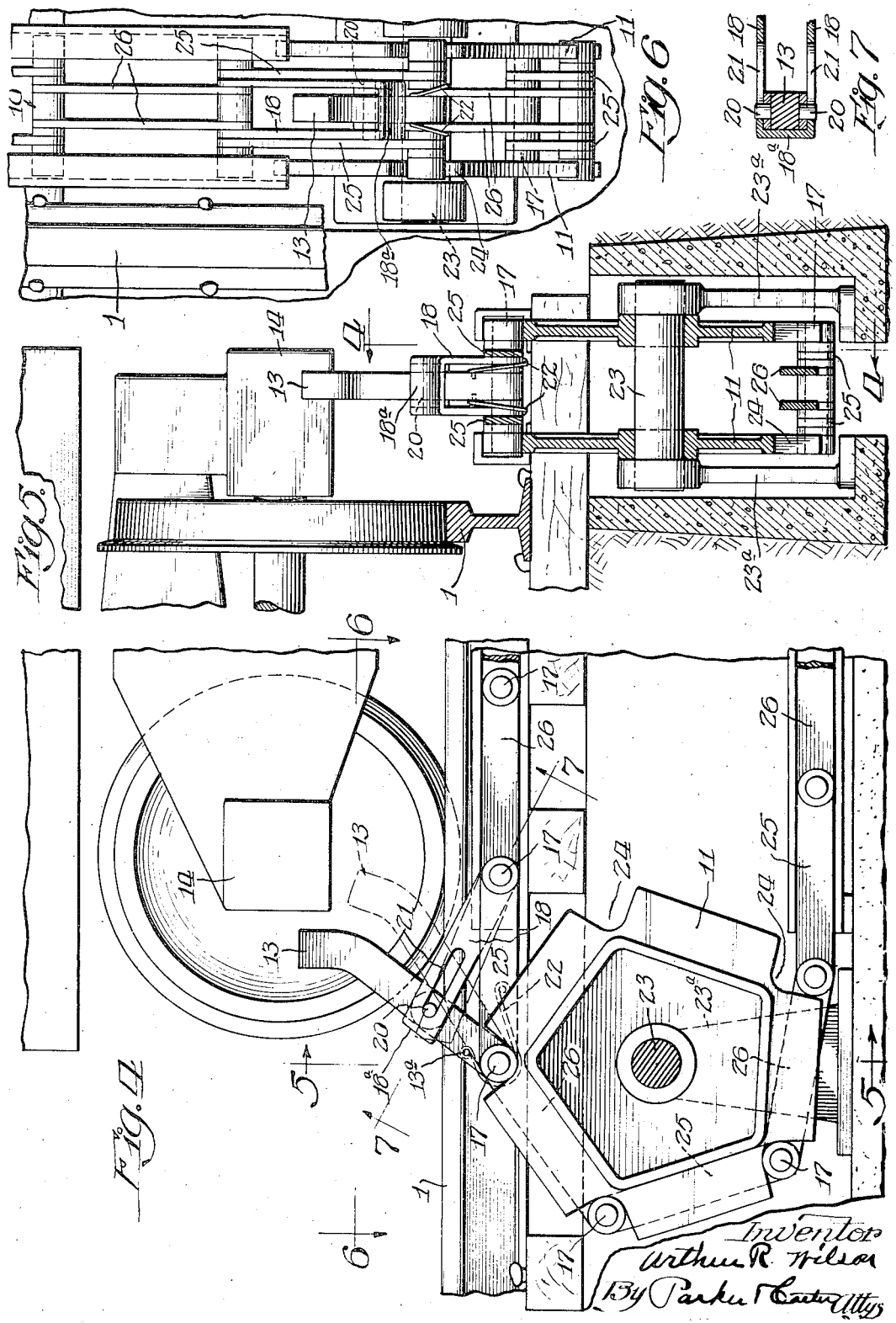

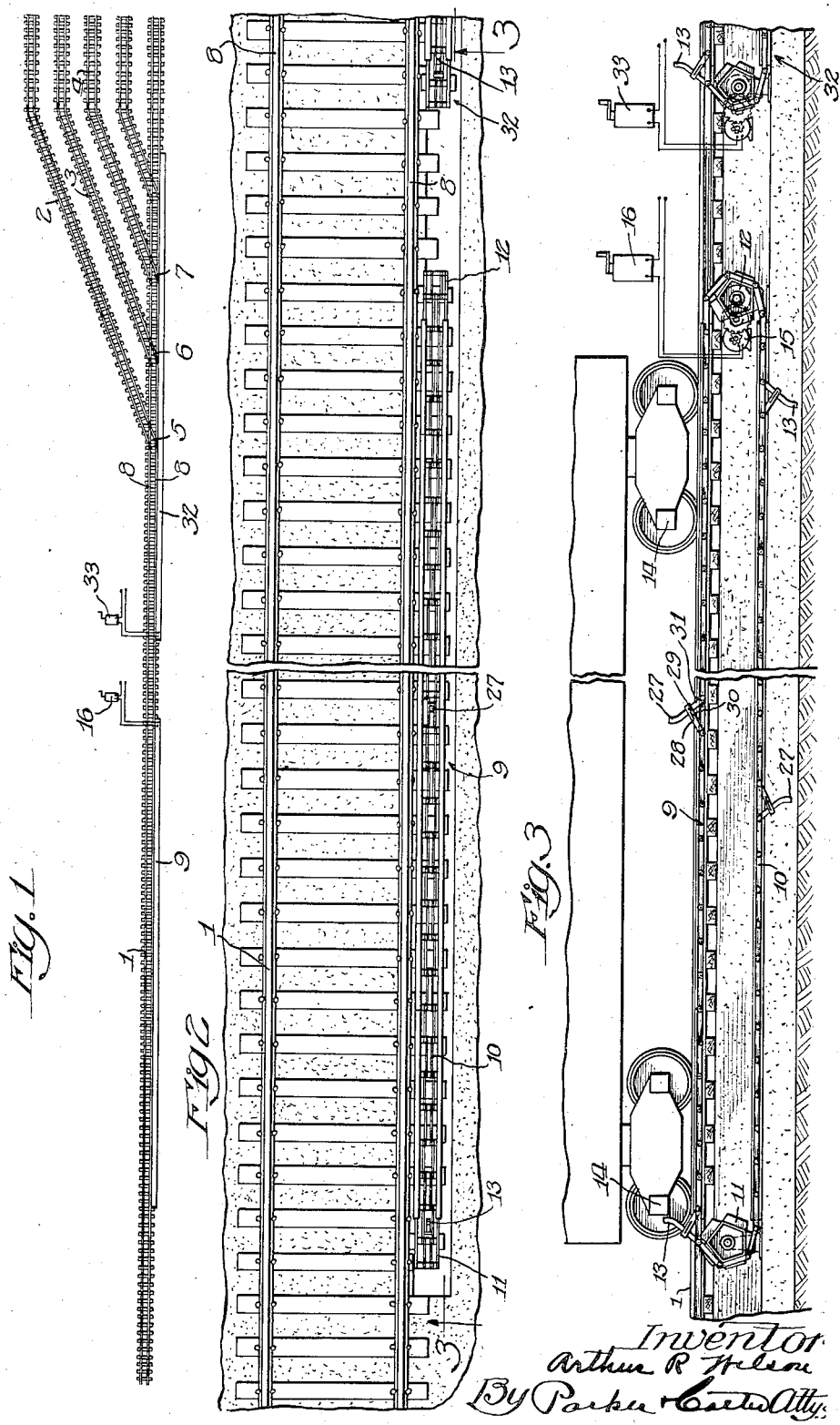

Patented May 12, 1936

2,040,353

UNITED STATES PATENT OFFICE 2,040,353

RAILROAD CAR HANDLING DEVICE

Arthur R. Wilson, Chicago, Ill.

Application June 11, 1931, Serial No. 543,569

8 Claims. (Cl. 104—172)

This invention relates to railroad car handling devices and has for its object to provide a new and improved device of this description. The invention has as a further object to provide a railroad car handling device arranged along the track and which shall engage the cars when they are in the proper position and move them along the track. The invention has as a further object to provide a railroad car handling device by means of which the cars may be moved and separated from each other and switched to any one of a plurality of tracks. The invention has as a further object to provide a railroad car handling device wherein there are two car moving devices located along the track and adapted to engage the cars and move them, the two moving devices traveling at different speeds so that the cars may be moved and separated and switched to different tracks. The invention has other objects which are more particularly pointed out in the accompanying description.

Referring now to the drawings, Fig. 1 is a plan view illustrating one form of the invention;

Fig. 2 is an enlarged plan view of a part of the main track;

Fig. 3 is a sectional view taken on line 3—3 of Fig. 2;

Fig. 4 is a sectional view taken on line 4—4 of Fig. 5;

Fig. 5 is a sectional view taken on line 5—5 of Fig. 4;

Fig. 6 is a sectional view taken on line 6—6 of Fig. 4; and

Fig. 7 is a sectional view taken on line 7—7 of Fig. 4.

Referring now to Fig. 1, I have shown a track 1 upon which the cars are moved by the engine, or through any other agency. Connecting with the track 1 are a series of tracks 2, 3, 4, etc. These tracks have switches by means of which any one of them can be connected to the track 1. I have shown these tracks diagrammatically as having the switch members 5, 6, 7, etc. These switch members are moved to their operative and inoperative positions by any of the usual methods, preferably by an operator at a distance. When, for example, they are moved to connect with the rails 8 of the track 1 and are in proper position with relation thereto, the cars on track 1, when moved therealong, will be transferred from track 1 to the other tracks. If the track 2 is connected with the rails 8 of the track 1, then the cars moving on track 1 will be transferred to track 2. If the track 2 is disconnected from the rails 8, the cars will be transferred to track 3. It will be seen that the cars may thus be transferred to any track desired and that any number of these tracks may be used as desired.

There is arranged along the track 1 a car moving device 9 which is placed at the side of the track. This car moving device may be of any suitable construction, and as herein shown consists of an endless chain or belt 10 which passes over wheels 11 and 12 at the ends thereof, and which is provided at intervals with the car engaging members 13 arranged to engage some part on the car, such for example as the journal box 14.

The belt 10 is operated in any suitable manner, as for example by a motor 15 which is operatively connected with one of the wheels, such as the wheel 12. This motor is controlled by a controller 16 at the side of the track. The car engaging members 13 are connected with the belt 10 at proper intervals, and as the belt is moved they engage the car, as shown for example in Fig. 3. These car engaging devices are preferably arranged so that if the car, in being moved thereon, strikes the front portion thereof these devices will be moved down out of the way. A simple construction for this purpose is illustrated in Fig. 4, wherein the car engaging member 13 is shown as pivoted to the pin 17 which forms part of the belt, and as being connected with the members 18 pivoted to an adjacent pin 17 on the belt, the connection being by means of a pin 20 working in a slot 21 in each of the members 18.

It will be seen that if the car strikes the car engaging member 13 on the front side, it will be moved down, as shown in dotted lines, out of the way and let the car pass. The device is provided with a retracting spring 22 which automatically moves the car engaging member 13 back to its engaging position, as shown in full lines in Fig. 4, after the car has passed. When in the full line position of Fig. 4, the car engaging member 13 will engage the journal box 14 and move the car along.

In the construction shown in the drawings the wheels 11 and 12 have a central shaft 23, see Fig. 5, the wheels being made in two separated parts. These parts have at intervals recesses 24. The belt consists of separated members 25 and 26 which are connected to pins 17, these pins working in the recesses 24 on the wheels. Between the members 25 and 26 are located the car engaging members 13, as clearly shown in Fig. 5.

I prefer to provide the belt at suitable intervals with stops so that the cars can be stopped by stopping the belt. These stops are devices similar to the car engaging devices, but reversed in position and each consisting of a member 27 pivoted to one of the pins 17 of the belt and the members 28 pivoted to an adjacent pin 17, the member 27 having a pin 29 which works in slots 30 in the members 28. There is a retracting spring 31 connecting the members 27 and 28.

I prefer to provide a second car moving device 32 similar to the car moving device 9 and which has similar parts which are given the same reference numerals as the parts of the car moving device 9, and which is controlled by the controller 33 at the side of the track. The car moving device 32 is preferably arranged to be moved at a higher speed than the car moving device 9, so that when a car passes thereon it will be separated from the other cars a sufficient distance to allow it to be switched to one of the switch tracks.

It will be seen that by means of this construction the first car moving device moves the series of cars in a train at the desired speed, and then the end car is transferred to the second car moving device, and since this second car moving device moves at a great speed, it will separate the end car from the rest of the cars, the cars of course being uncoupled. This will permit this separated end car to be sent along any one of the switch tracks which is in proper condition to receive it. It will therefore be seen that as the cars come on to the second car moving device they are separated from the train and that any desired car can be sent down any one of the switches, the switches being controlled, as is customary, by an operator in a tower at a distant point.

I claim:

1. A railroad car handling device comprising two separated car moving devices arranged along the track, each having car engaging parts thereon, the second car moving device operating at a higher speed than the first car moving device so that it separates the cars as they pass from the first car moving device to the second car moving device.

2. A railroad car handling device comprising two separated car moving devices arranged along the track, each having car engaging parts thereon, the second car moving device operating at a higher speed than the first car moving device so that it separates the cars as they pass from the first car moving device to the second car moving device, and car stopping devices on each of said car moving devices.

3. A railroad car handling device comprising two separated car moving devices arranged along the track, each having car engaging parts thereon, the second car moving device operating at a higher speed than the first car moving device so that it separates the cars as they pass from the first car moving device to the second car moving device, and a series of switches associated with the track to any one of which the separated cars may be transferred.

4. A railroad car handling device comprising two separated car moving devices arranged along the track, each consisting of an endless belt, means for moving said belts, car engaging devices on said belts adapted to engage some part of the car, one of the belts being operated at a higher speed than the other belt so as to separate the cars from each other as they come under the operation thereof.

5. A railroad car handling device comprising two separated car moving devices arranged along the track and adjacent to each other, one of the car moving devices adapted to move the cars along the track while in proximity to each other, the other car moving device adapted to separate the cars from each other so that they may be transferred to different tracks.

6. A railroad car handling device comprising a power driven car moving device arranged along the track for engaging and moving the cars at the same speed while they are adjacent to each other, and separate power driven means for engaging said car acted upon by said car moving device for separating said cars so that they may be transferred to different tracks and having a speed greater than the speed of the first mentioned power driven car moving device.

7. A device of the kind described comprising a railroad car handling device comprising a car moving device extending substantially parallel to the track provided with an endless belt, car engaging devices connected with said belt, each comprising two rigid members slidably connected together and pivotally connected to the belt, one of said members forming a car engaging member, means for normally holding the car engaging member in its car engaging position and for limiting its sliding movement in one direction with relation to the other member when in the car engaging position, the car engaging member being free to slide in the other direction with relation to said other member said latter member formed of two separated parts with a connecting portion connecting them together, the car engaging member being located between the parts and engaging the connecting portion when the car is being moved.

8. A railroad car handling device comprising an endless belt, a rigid looped member pivoted at its free end to the belt, a rigid car engaging member pivoted to the belt and located within the looped member and engaging the closed end of the loop when the car engaging member is in its car engaging position, means for normally maintaining the car engaging device in its car engaging position, and a sliding connection between the car engaging member and the looped member, whereby the car engaging member will be automatically moved out of car engaging position by the car when the car engaging device and the car are moving relatively in one direction, but will engage the car when they are moving relatively in the other direction.

ARTHUR R. WILSON.